Feb. 15, 1944. F. W. SCHILLBERG 2,341,659
TOOL HOLDER
Filed Oct. 6, 1942
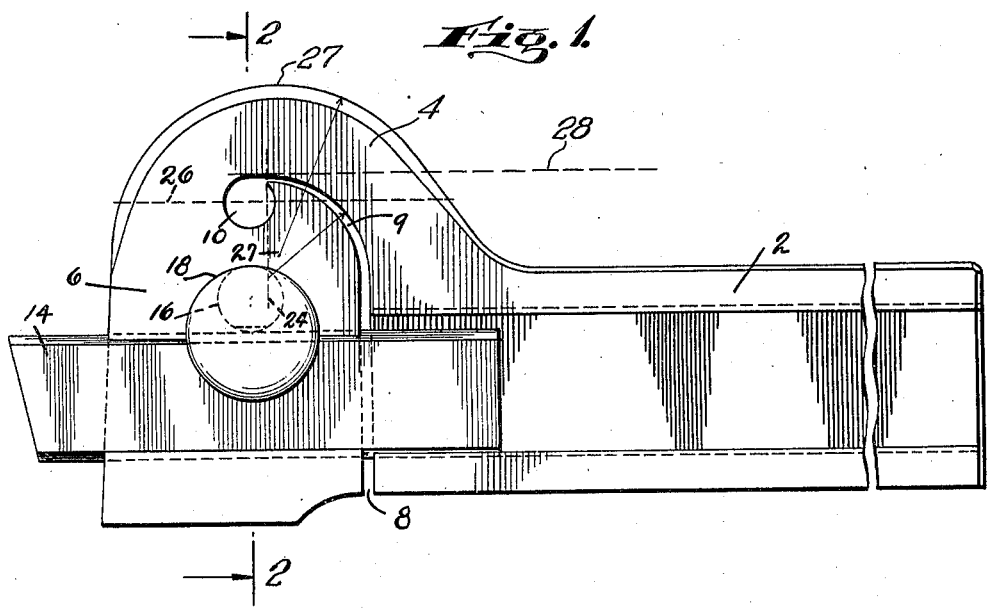
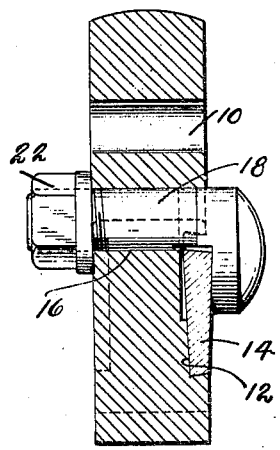
INVENTOR
Frank W. Schillberg,
BY James G. Beuhlie
ATTORNEY Patented Feb. 15, 1944

2,341,659

UNITED STATES PATENT OFFICE 2,341,659

TOOLHOLDER

Frank W. Schillberg, Bridgeport, Conn., assignor to Auto-Ordnance Corporation, Bridgeport, Conn., a corporation of New York Application October 6, 1942, Serial No. 460,930

3 Claims. (Cl. 29—96)

This invention relates to an improvement in tool holders, and more particularly to spring tool holders for tools employed in lathes, shapers, screw machines, etc.

More specifically my invention provides a tool holder having a resilient or yielding head whereby a tool carried in my improved holder may yield or recede downwardly from the work in an arc of a circle whenever a heavy cut is made or an unusually tough spot is encountered in the work-piece being operated upon, thereby to avoid chattering of the tool and tearing of the work, so that a smooth finish on the work is assured.

In turning down, threading, or performing other operations on a lathe, for example, no difficulty is experienced so long as the cut is not too heavy, and so long as the metal being worked upon is free of tough areas. However, whenever it is desired to take a very heavy cut, then, despite the fact that the tool holder is rigidly clamped in a tool post, care must be exercised by the operator to prevent chattering of the tool and tearing of the work. The same difficulty is experienced when hard or tough spots are encountered in the work-piece. These difficulties are particularly pronounced with the high speed tools employed in modern practice. I have overcome these inherent difficulties with the tool holder of the present invention in a very simple, practicable manner, in that I provide a tool holder which is so constructed that the tool, when unexpectedly called upon to take a heavy cut or when it strikes a hard or tough spot in the work-piece, will yield downwardly away from the work in an arc, moving about a center which lies within the tool holder head. This movement, it will be appreciated, is small, but is sufficient nevertheless to prevent chattering and tearing of the work.

I appreciate fully that spring tool holders have been made and used prior to my invention, but in those holders the design has been such that the tool is permitted to yield or recede from the work in a straight line. I have found from experience, that despite the contrary contention, such construction, in many instances, tends to increase chatter and the breaking of cutter points.

My construction is superior to these prior spring tool holders in that the tendency for the tool to chatter and tear the work and break the cutter point is eliminated, by reason of the fact that I allow the tool or cutter to yield in a curved line away from the work instead of in a straight line as in the prior holders.

I have found, furthermore, with my improved holder that faster feeds may be employed and heavier cuts taken than heretofore possible either with the prior spring tool holders or with the prior tool holders of the solid type.

My invention, it will be understood, provides a tool holder adapted for use in connection with a full line of tools for lathes, shapers, screw machines, etc., namely: threading tools, forming tools, cutting off tools, and so forth.

In the accompanying drawing wherein I have illustrated one embodiment of my invention:

Fig. 1 is a side elevational view of a holder constructed in accordance with my invention; and Fig. 2 is a section along the line 2—2 of Fig. 1.

Referring to the drawing in detail: 2 designates the shank of my improved tool holder. This shank, it will be understood, is adapted to be clamped in the usual way in the tool post of a lathe or other machine with which the tool holder is employed.

The forward end of the shank 2 of the tool holder is provided with an integral neck 4 and tool-carrying head 6.

The head 6 lies below the neck 4, and is separated therefrom by a narrow slot or gap 8, this gap, which is of special form, extending from the bottom of the shank 2 to the top of the head 6, where it terminates in a cylindrical enlargement or hole 10.

The side of the head 6, in the holder illustrated, is provided with a groove 12 for the reception of a tool or cutter 14 to be held in the holder, this groove extending from front to rear of the head 6. This is a dovetail groove and the tool 14 is correspondingly shaped. In line with this groove the shank 2 is grooved to receive the tail of the tool or cutter, this groove being slightly larger than the tool tail to permit the head and tool to have the desired yieldability.

To clamp the tool in its groove I provide a clamping bolt 18 passing through bore 16 of the holder head. The head of this bolt is eccentric to the bolt so as to overlie the side of the tool, as seen in Fig. 2, so that when the nut 22 is tightened the bolt will clamp the tool rigidly in place.

As above mentioned, my tool holder is so constructed as to yield downwardly from the work in an arc, upon encountering a tough spot in the work-piece or when it is desired to take an exceedingly heavy cut, I having found that such movement of the tool is superior in results obtained, so far as absence of chattering of the tool and tearing of the work are concerned, as compared with previous constructions wherein the head yields in a straight line.

To obtain the action I desire so far as yielding of the tool is concerned, I extend the gap 8 vertically of the holder and in a straight line from the lower edge of the shank 2 to a point about on a line with the upper edge of the shank 2. From thence the gap curves upwardly and forwardly toward the front of the head 6 in an arc 9 which terminates in cylindrical enlargement 10 above the bore 16. The center of arc 9 lies between the cylindrical terminal 10 and center of bore 16 and on a line 24 intersecting bore 16 and extending parallel to a line joining 10 and the center of bore 16. The radius of this arc 9 of gap 8 approximates the distance between the terminal 10 and center of bore 16. The gap, of course, determines the shape of the underside of the neck 4 of the tool holder.

Now, with respect to the upper side or upper edge of the neck 4: This part of the neck of the holder is arcuate from about the point of intersection of the front or forward edge of the tool holder head with a line 26 drawn through the center of cylindrical terminal enlargement 10 at right angles to the line 24. The center of this arc, which I shall designate 27, lies to the rear of and above the center of the arc 9 of the gap 8. The arc 27 of the upper edge of the neck terminates substantially at its intersection with a line 28 tangent to the upper edge of the terminal enlargement 10 and extending rearwardly of this terminal parallel to the line 26. From this point the upper edge of the neck slopes downwardly and rearwardly until it meets the shank 2.

I find by reason of the described shape of the gap 8, its location with respect to the neck 4, together with the shape of the neck, that the head 6 of the tool holder is adapted to yield when the tool carried by the head encounters a tough area in the work or whenever an extremely heavy cut is being taken so that the head 6 and tool 14 will move downwardly and rearwardly in a curved or arcuate path away from the work. I have found that this very effectively prevents chattering and jumping of the tool so that tearing of the work and marking of the same, and breaking of the tool point, are avoided and a nice, clean, smooth finish is obtained.

It is understood that while I have illustrated and described one embodiment of my invention, changes in the details of construction thereof may be made within the purview of my invention.

What I claim is:

1. A tool holder comprising a shank, a head, a neck connecting the shank and head, said head being bored transversely for the reception of a tool clamp for clamping a tool to the head, said head underlying the said neck and being separated therefrom by a gap, said gap extending vertically of the holder to a point substantially in line with the upper edge of said shank and then curving upwardly and forwardly in an arc terminating in a cylindrical enlargement above the bore of said head, the center of said arc lying intermediate the terminal of the arc and the center of said bore and on a line intersecting said bore and extending parallel to a line joining said terminal and center and the radius of the arc approximating the distance between the arc terminal and the said bore center.

2. A tool holder comprising a shank, a head, a neck connecting the shank and head, said head being bored transversely for the reception of a tool clamp for clamping a tool to the head, said head underlying the said neck and being separated therefrom by a gap, said gap extending vertically of the holder to a point substantially in line with the upper edge of said shank and then curving upwardly and forwardly in an arc terminating in a cylindrical enlargement, the center of which lies above and in vertical alignment with the center of the said bore, the center of said arc lying intermediate the terminal of the arc and the center of said bore and on a line intersecting said bore and extending parallel to a line joining said terminal and center and the radius of the arc approximating the distance between the arc terminal and the said bore center.

3. A tool holder comprising a shank, a head, a neck connecting the shank and head, said head being bored transversely for the reception of a tool clamping bolt for clamping a tool to the head, said head underlying the said neck and being separated therefrom by a gap, said gap extending vertically of the holder to a point substantially in line with the upper edge of the shank and then curving upwardly and forwardly of the head in an arc terminating in a cylindrical enlargement above the said bore, and in line with the center thereof, the outer edge of said neck being arcuate from the point of intersection of the front edge of the holder with a line drawn through the center of said cylindrical enlargement at right angles to a line connecting the centers of said cylindrical enlargement and said bore, the center of this arc lying to the rear of and above the center of the first mentioned arc, the arcuate portion of said neck terminating substantially at its intersection with a line tangent to the upper edge of the terminal enlargement and running at right angles to a line joining the centers of the terminal enlargement and said bore.

FRANK W. SCHILLBERG.